United States Patent [19]

Thompson

[11] 4,285,712
[45] Aug. 25, 1981

[54] APPARATUS AND METHOD FOR THE PRODUCTION OF GLASS FIBERS

[75] Inventor: Thomas K. Thompson, Granville, Ohio

[73] Assignee: Owens-Corning Fiberglass Corporation, Toledo, Ohio

[21] Appl. No.: 86,924

[22] Filed: Oct. 22, 1979

[51] Int. Cl.³ ............................................. C03B 37/02
[52] U.S. Cl. ........................................ 65/2; 65/11 W; 65/12; 65/29; 65/162; 65/DIG. 4
[58] Field of Search .................. 65/1, 2, 11 W, 12, 29, 65/162, DIG. 4

[56] References Cited

U.S. PATENT DOCUMENTS

| 3,280,967 | 6/1974 | Johnson | 65/2 |
| 3,649,231 | 3/1972 | Trethewey | 65/2 |
| 4,149,865 | 4/1979 | Coggin et al. | 65/2 X |
| 4,167,403 | 9/1979 | Coggin | 65/2 X |
| 4,178,162 | 12/1979 | Shono et al. | 65/1 |

Primary Examiner—Robert L. Lindsay, Jr.
Attorney, Agent, or Firm—Ronald C. Hudgens; Philip R. Cloutier; Kenneth H. Wetmore

[57] ABSTRACT

The invention relates to apparatus and method for producing fibers from heat-softened mineral material, such as glass. More specifically, this invention relates to method of, and apparatus for, producing glass fibers from an electrically heated bushing having a bottom wall with an orifice section for delivery of glass streams for attenuation into fibers comprising sensing the temperature at the orifice section, supplying a signal that varies in response to the sensed temperature and indicating that a disruption in fiber production has occurred when the supplied signal is outside a predetermined range.

16 Claims, 9 Drawing Figures

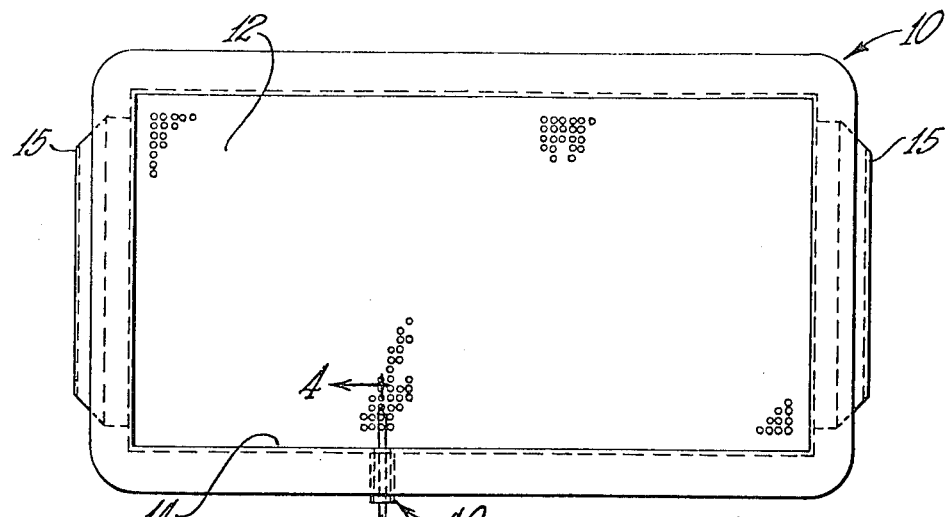
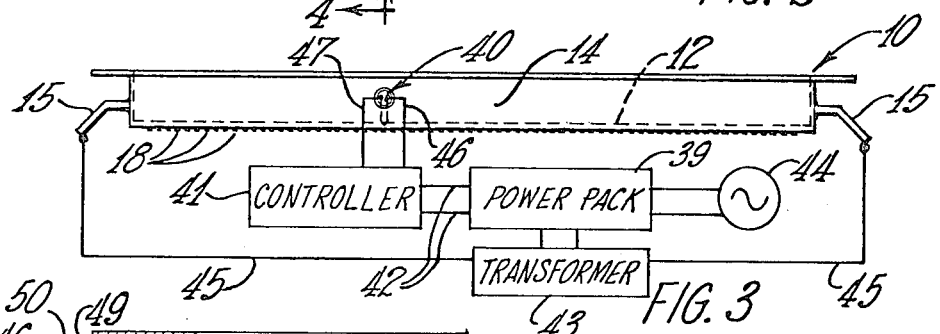
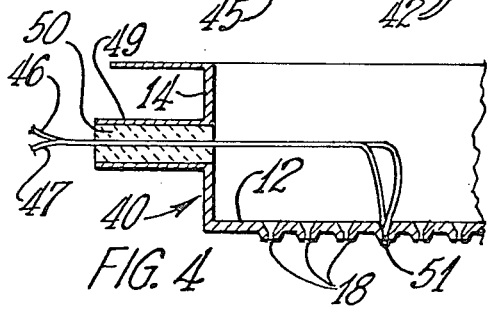
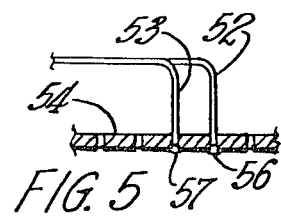
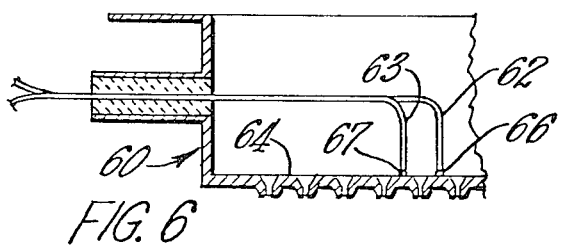

APPARATUS AND METHOD FOR THE PRODUCTION OF GLASS FIBERS

TECHNICAL FIELD

The invention relates to method of, and apparatus for, producing fibers from heat-softened mineral material, such as glass. More specifically, this invention relates to method of, and apparatus for, producing glass fibers from an electrically heated bushing having a bottom wall with an orifice section for delivery of glass streams for attenuation into fibers comprising sensing the temperature at the orifice section, supplying a signal that varies in response to the sensed temperature and indicating that a disruption in fiber production has occurred when the supplied signal indicates that the sensed temperature is outside a predetermined temperature range.

BACKGROUND ART

It has been conventional practice for many years to use thermocouples attached to the sidewalls of glass fiber forming bushings. Such bushings are electrically heated and are coupled to power transformers for supply of electrical current thereto. The power level supplied to the resistance heated bushings is controlled by a controller unit. The output signal from the sidewall thermocouple is fed into the controller unit. The controller measures the signal, compares it against a reference and then makes necessary changes in the power supply to the bushing.

In practice, it has been found that such sidewall thermocouples are less accurate than desired in determining the representative temperature of the glass material inside the bushing at the orifice section of the base plate. Also, the reaction time of such sidewall thermocouples in sensing changes in the temperature of the glass material at the orifice section of the base plate is slower than desired. Thus, improved method and apparatus for sensing and controlling the temperature of the glass material inside a glass fiber forming bushing at the orifice section of the bottom wall is desired.

SUMMARY OF THE INVENTION

The present invention comprises method for producing glass fibers from an electrically heated bushing having a bottom wall with an orifice section for delivery of glass streams for attenuation into fibers comprising sensing the temperature at the orifice section, supplying a signal that varies in response to the sensed temperature and indicating that a disruption in fiber production has occurred when the supplied signal is outside a predetermined range.

The present invention comprises apparatus for producing glass fibers from an electrically heated bushing having a bottom wall with an orifice section for delivery of glass streams for attenuation into fibers comprising means for sensing the temperature at the orifice section, means for supplying a signal that varies in response to the sensed temperature and means for indicating that a disruption in fiber production has occurred when the supplied signal is outside a predetermined range.

An object of the invention is to provide improved method of producing glass fibers.

Another object of the invention is to provide improved apparatus for the production of glass fibers.

These and other objects of the invention will become more apparent as the invention is described hereinafter in detail with reference to the accompanying drawings.

DESCRIPTION OF THE DRAWINGS

FIG. 2 is a plan view of a glass fiber forming bushing.

FIG. 3 is a side elevation view of a glass fiber forming bushing.

FIG. 4 is a sectional view taken substantially on the line 4—4 of FIG. 2.

FIG. 5 is a partial cross-sectional view of a glass fiber forming bushing.

FIG. 6 is a partial cross-sectional view of a glass fiber forming bushing.

FIG. 7 is a partial cross-sectional view of a glass fiber forming bushing.

DESCRIPTION OF THE PREFERRED EMBODIMENTS

It is to be understood that the invention is not limited in its application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the method and apparatus of the invention have particular utility in the processing of glass for forming fibers or filaments, it is to be understood that the method and apparatus can be employed for producing fibers from other materials.

Figure 1:
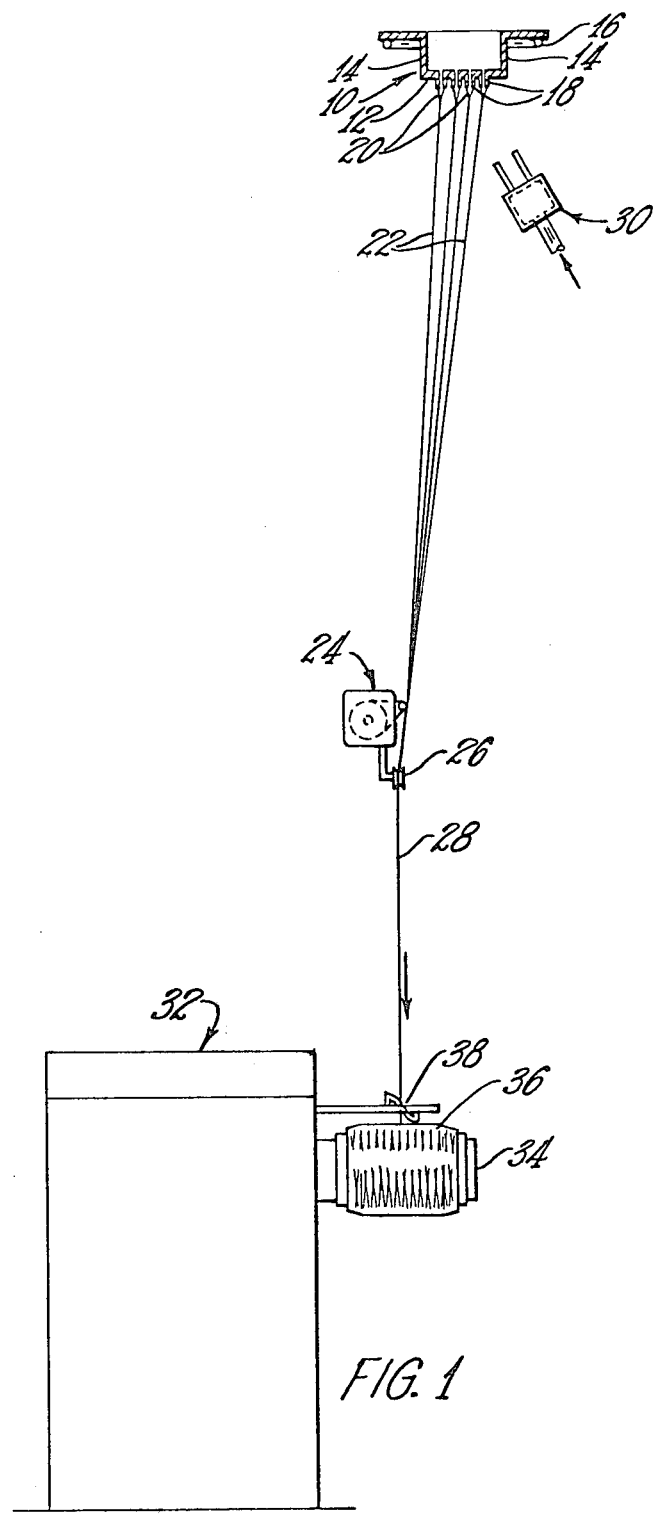
FIG. 1 is a semi-schematic elevational view of a fiber forming apparatus.

Referring to the drawings in detail, FIG. 1 illustrates a fiber forming operation. Mineral material, such as glass, is maintained in a molten condition in the bushing of stream feeder assembly 10 from which a plurality of streams of material 20 are emitted from orificed tips or projections 18 depending from the base plate or feeder floor 12. Bushings which do not have tips but have a substantially planar orificed bottom wall can also be used. A supply of molten material is contained above the base plate by upwardly extending sidewalls 14. A cooling coil 16 extends around the upper portion of the upwardly extending walls to congeal the glass and prevent its leakage from the bushing.

The streams of glass form cones at the discharge end of the orifice projections. Glass fibers 22 are attenuated from the cones of molten glass by winder apparatus 32. The fibers are coated by size applicator 24 and gathered into strand 28 by gathering shoe 26. The strand is reciprocated by traverse 38 as it is collected into package 36 on winder collet 34.

To control the glass fiber forming environment, blower means 30 is provided. It is also within the scope of the present invention to use conventional finshield glass fiber forming environment control apparatus rather than the blower apparatus as shown.

The bushing assembly of FIG. 1 is shown in greater detail in FIGS. 2 through 4. The bushing chamber comprises a bottom wall or base plate 12 and upwardly extending sidewalls 14. The bushing is electrically heated. Electrical terminals or ears 15 are connected to the ends of the bushing to provide for resistance heating of the bushing. These electrical terminals are connected to a power transformer through suitable leads 45. Electrical power is supplied to the transformer by power source 44 and the power transmitted from the transformer is controlled through power pack 39 by controller 41. The controller receives an electrical signal through wires 46 and 47 from thermocouple assembly 40. The probe, or sensing, end of the thermocouple is shown to be in the central region of the orifice area. The probe end can be located in other positions of the orifice area, such as the outer area or the exact center. The controller compares the thermocouple signal to that desired and controls the output of the transformer by signals transmitted thereto through leads 42.

FIG. 4 shows, in greater detail, the means for sensing the temperature of the orificed section of the base plate as an indication of the glass material temperature inside the bushing at the orifice section. Thermocouple wires 46 and 47 extend into the bushing through opening or passageway 48 in the bushing sidewall. The sidewall is provided with an outwardly extending collar or sleeve 49 surrounding the opening into the bushing. The sleeve is of a heat resistant material such as a platinum/rhodium alloy. As shown, the sleeve is welded to sidewall 14. To prevent molten glass from passing from the bushing through the opening in the sidewall, the passageway is filled with a sealing material, such as a refractory material. To further insure that molten glass does not leak from the bushing between the refractory material and the sleeve 49 a cooling coil such as the water cooled coil shown in FIG. 1 can be provided to maintain the temperature at the outer regions of the passageway below that of molten glass to congeal the glass.

The thermocouple wires extend into the bushing to the orifice section of the base plate. As shown in FIG. 4, the wires extend outwardly from the sidewall into the supply of glass material. However, the wires can extend along the inside of the bushing (along the sidewall and along the bottom wall) to the orifice section of the bottom wall. The two thermocouple leads terminate at the bottom wall and are welded together and to the bottom wall to form a connection 51 within an orifice of the base plate. Thus, the temperature of the orifice section of the base plate is sensed by the thermocouple and an appropriate electrical signal produced thereby. The sensed temperature of the orifice section indicates the temperature of the glass above and at the exit region of the orifice section.

The sensing end of the thermocouple, by being positioned at the orificed section of the base plate, is in a position to quickly and accurately sense changes in temperature at the orifice area of the base plate. This is very important in the production of glass fibers. With the thermocouple at the orifice section, the controller can modify the power transmitted to the bushing to control changes in the temperature of the glass material at the orifice section of the base plate even before such temperature changes can be sensed by a thermocouple conventionally positioned at the sidewalls of such a glass fiber forming bushing.

Convention high temperature thermocouples can be used. For example, an "R" type thermocouple which has one lead of pure platinum and one lead of 87% platinum/13% rhodium can be used. Also, an "S" type thermocouple which has one lead of pure platinum and one lead of 90% platinum/10% rhodium can be used.

FIGS. 5, 6, and 7 show other embodiments of the invention in respect to the positioning of the thermocouple leads. FIG. 5 shows another way of affixing the thermocouple wires extending into the orifice section of a generally flat, or tipless, base plate 54. One thermocouple lead 52 is in contact with, or welded within, a first orifice 56 and the other thermocouple lead 53 is welded or attached within a second orifice 57. FIG. 6 illustrates another embodiment of a bushing of similar construction to that described in FIG. 4. Thermocouple lead 62 is attached or affixed at a first location 66 on the base plate 64 and the second lead 63 is attached at a second location 67 on the base plate. The first and second locations are spaced from each other. FIG. 7 illustrates another embodiment of attaching the thermocouple leads to a generally flat or tipless base plate 72. The end regions of leads 70 and 71 are brought together and welded together at one point 74 on the upper surface of the base plate.

Figure 8:
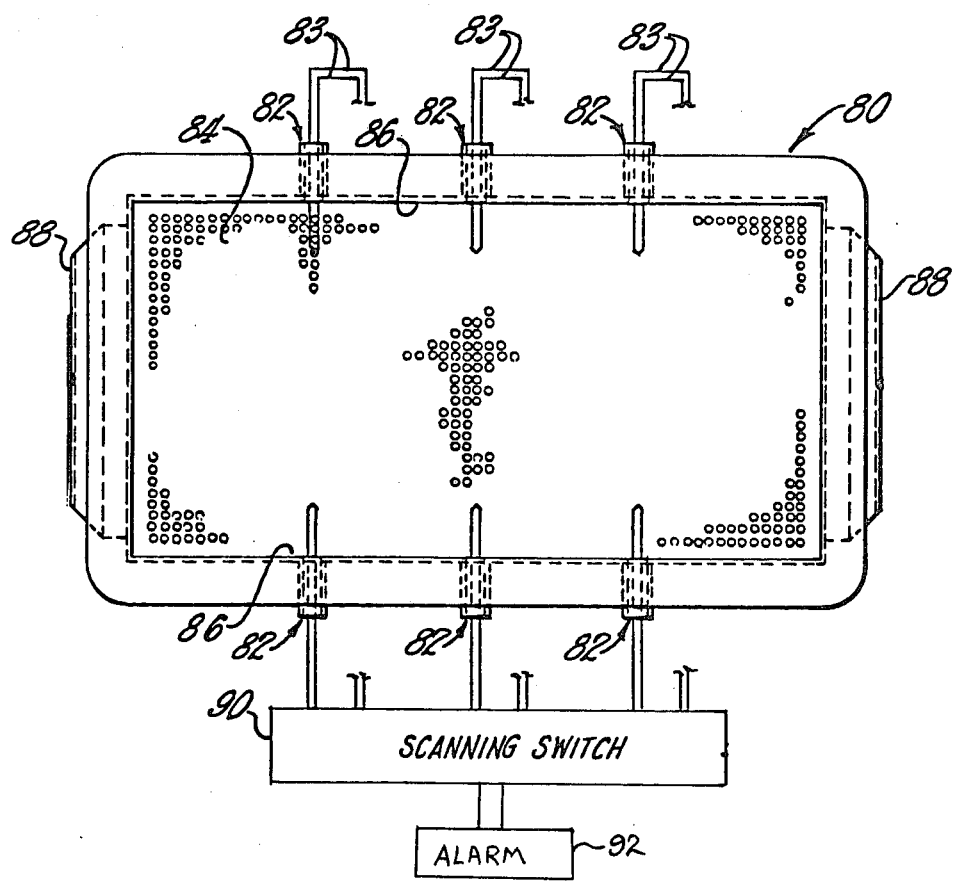
FIG. 8 is a plan view of a glass fiber forming bushing.
Figure 9:
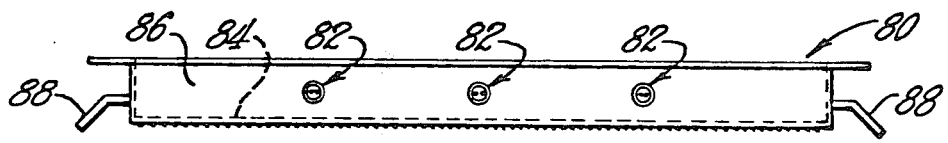
FIG. 9 is a side elevation view of a glass fiber forming bushing.

The bushing assembly shown in FIGS. 8 and 9 can be used in the glass fiber forming process as defined and shown in FIG. 1. Bushing assembly 80 comprises a chamber having sidewalls 86 and bottom wall 84. Electric terminals or ears 88 are connected to the ends of the bushing to provide for resistance heating of the bushing. Such a bushing can be electrically heated as described in my copending patent application Ser. No. 086,923, now abandoned filed on even date. Such disclosure is hereby incorporated by reference.

As can be seen from FIGS. 8 and 9, the scanning switch monitors the plurality of thermocouples. Thermocouple assemblies 82 sense temperatures of the orifice section at spaced-apart locations. Signals from the thermocouple assemblies are sent to the scanning switch through leads 83. The sensing means, or thermocouple assemblies, are generally as described in regard to the thermocouple assembly shown in FIG. 4. The thermocouples can be balanced or normalized so that they each send the same signal for a given temperature. Six thermocouple assemblies are shown in this embodiment, although it is within the scope of the invention to have one or any plurality of temperature sensing means.

As shown, the bushing orifice section comprises tips or orificed projections for the delivery of glass streams. It is within the scope of the invention that the orifice section has a generally flat undersurface rather than tips. As described above, the sensing end of the thermocouples can be attached to the upper surface of the orifice section or can be located within orifices of the orifice section.

Scanning switch 90 receives the signals from the thermocouple assemblies. The scanning switch compares each of the signals to a predetermined range to determine whether any signal indicates that the sensed temperature of a location is outside a predetermined temperature range. When the scanning switch determines that any temperature of the orifice section is outside the predetermined range, an indication is made that a disruption in the fiber production process has occurred. As shown, the scanning switch activates alarm 92 when a fiber production disruption has been indicated.

Having the ability to indicate that a disruption in fiber production has occurred when the temperature of any location is outside a predetermined temperature range makes it possible to initiate other actions. For example, when a fiber production disruption has been indicated, an alarm can be activated. The alarm can, for example, be a light or buzzer which alerts the operator that a break or disruption has occurred. Also, for example, the speed of the winder collet can be reduced or even stopped upon indication of a disruption. To reduce the tendency of the bushing to flood after a fiber production disruption, it is advantageous to reduce the electrical supply to the bushing to assist in keeping the orifice plate from becoming overheated. If the orifice section of the bushing has been partially flooded during the fiber forming interruption, lowering the electrical supply to the bushing will reduce the tendency of the flood to spread over the entire orifice section.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

I claim:

1. Method of producing glass fibers from an electrically heated bushing having a bottom wall with an orifice section for delivery of glass streams for attenuation into fibers comprising:
   a. attaching a temperature sensing means to the bushing bottom wall in the orifice area;
   b. sensing the temperature at the orifice section;
   c. supplying a signal that varies in response to the sensed temperature; and
   d. indicating that a disruption in fiber production has occurred when the supplied signal is outside a predetermined range.

2. The method of claim 1 comprising the step of activating an alarm when a fiber production disruption has been indicated.

3. The method of claim 1 comprising the step of modifying the winder collection speed when a fiber production disruption has been indicated.

4. The method of claim 3 wherein the winder is stopped.

5. The method of claim 1 comprising the step of reducing the electrical supply to the bushing when a fiber production disruption has been indicated.

6. Apparatus for producing glass fibers from an electrically heated bushing having a bottom wall with an orifice section for delivery of glass streams for attenuation into fibers comprising:
   a. a temperature sensing means attached to the bushing bottom wall in the orifice area for sensing the temperature at the orifice section;
   b. means for supplying a signal that varies in response to the sensed temperature; and
   c. means for indicating that a disruption in fiber production has occurred when the supplied signal is outside a predetermined range.

7. The apparatus of claim 6 wherein the means for sensing comprises a thermocouple at the orifice section of the bottom wall.

8. The apparatus of claim 7 wherein the thermocouple is attached to the upper surface of the orifice section.

9. The apparatus of claim 7 wherein the thermocouple is attached within an orifice of the orifice section.

10. The apparatus of claim 6 wherein the orifice section comprises tips.

11. The apparatus of claim 6 comprising means for activating an alarm when a fiber production disruption has been indicated.

12. Method of producing glass fibers from a bushing having a bottom wall with an orifice section for delivery of glass streams for attenuation into fibers comprising;
   a. attaching at least two temperature sensing means to the bushing bottom wall at spaced-apart locations in the orifice area;
   b. sensing temperatures of the orifice section at spaced-apart locations;
   c. supplying a signal for each location which varies in response to the sensed temperature at each location; and
   d. indicating that a disruption in fiber production has occurred when any of the supplied signals indicate that the sensed temperature at any location is outside a predetermined temperature range.

13. The method of claim 12 comprising the step of activating an alarm when a fiber production disruption has been indicated.

14. Apparatus for producing glass fibers from a bushing having a bottom wall with an orifice section for delivery of glass streams for attenuation into fibers comprising:
   a. at least two temperature sensing means attached to the bushing bottom wall at spaced-apart locations in the orifice area for sensing temperatures of the orifice section at spaced-apart locations;
   b. means for supplying a signal for each location which varies in response to the sensed temperature of each location; and
   c. means for indicating that a disruption in fiber production has occurred when any of the supplied signals indicate that the sensed temperature of any location is outside a predetermined temperature range.

15. The apparatus of claim 14 wherein the means for sensing comprises thermocouples at the orifice section of the orifice section.

16. The apparatus of claim 14 comprising means for activating an alarm when a fiber production disruption has been indicated.

* * * * *

UNITED STATES PATENT AND TRADEMARK OFFICE
CERTIFICATE OF CORRECTION

PATENT NO. : 4,285,712

DATED : August 25, 1981

INVENTOR(S) : Thomas K. Thompson

It is certified that error appears in the above—identified patent and that said Letters Patent is hereby corrected as shown below:

Column 2, line 53 should read:

of the orificed projections. Glass fibers 22 are attenuated

Column 6, line 54 should read:

sensing comprises thermocouples at the orifice section.

Column 6, delete line 55

Signed and Sealed this

Tenth Day of November 1981

[SEAL]

Attest:

Attesting Officer

GERALD J. MOSSINGHOFF

Commissioner of Patents and Trademarks